Dec. 27, 1955

C. QUIGLEY 2,728,601

BALE STACKER TRAILER

Filed Feb. 26, 1954

Clifford Quigley
INVENTOR.

BY *Clarence A. O'Brien*
*and Harvey B. Jacobson*
Attorneys

Dec. 27, 1955 C. QUIGLEY 2,728,601
BALE STACKER TRAILER
Filed Feb. 26, 1954 2 Sheets-Sheet 2
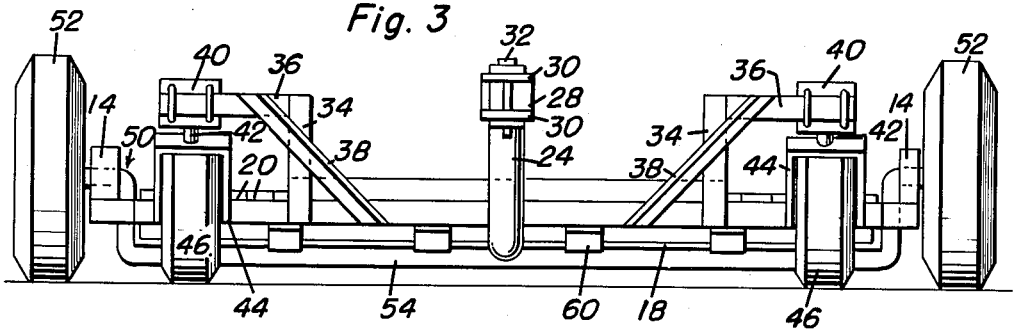
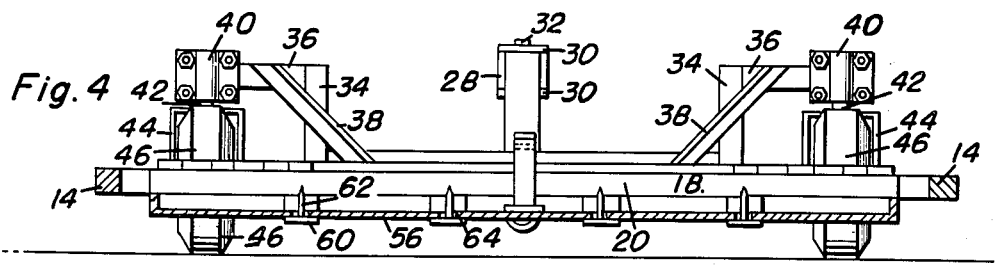
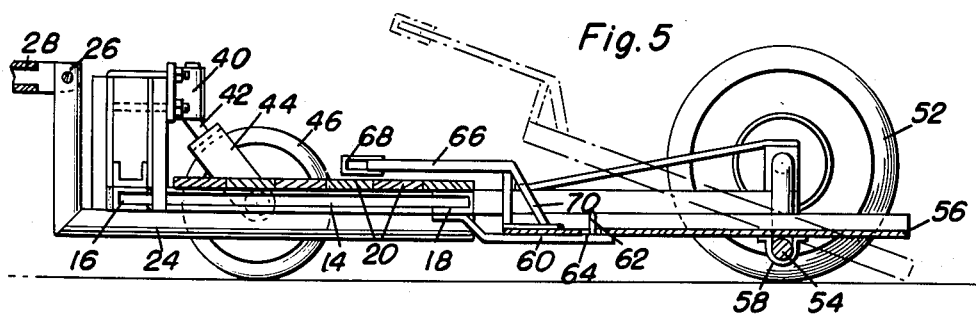
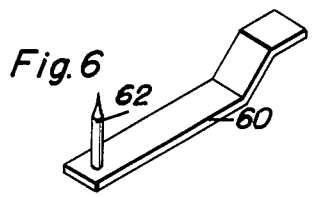
Clifford Quigley
INVENTOR.

United States Patent Office 2,728,601
Patented Dec. 27, 1955

2,728,601

BALE STACKER TRAILER

Clifford Quigley, Avon, Mont.

Application February 26, 1954, Serial No. 412,736

1 Claim. (Cl. 298—17)

This invention relates to a bale stacker and more particularly to a device adapted to be towed behind a baler whereby a plurality of bales may be placed thereon and then deposited at spaced intervals on a field.

An object of this invention is to provide a bale stacker for use with a baling machine whereby the bales discharged from the baling machine may be stacked thereon to a predetermined height and then selectively deposited at various positions in a field whereby they may be conveniently picked up in groups.

Another object of this invention is to provide a bale stacker having novel means thereon for retaining the bales in position thereon prior to the depositing of the bales on the ground.

A still further object of this invention is to provide a bale stacker which is positioned closed to the ground so that the stack of bales placed thereon may be easily deposited on the ground without upsetting the stack.

A yet further object of this invention is to provide a bale stacker which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a front elevational view of the bale stacker forming the subject of this invention;

Figure 4 is a sectional view taken substantially along the section line 4—4 of Figure 1;

Figure 5 is a sectional view taken substantially along the section line 5—5 of Figure 1; and Figure 6 is a perspective view of one of the arms forming the retaining means for positioning the bales on the stacker.

Figure 1:
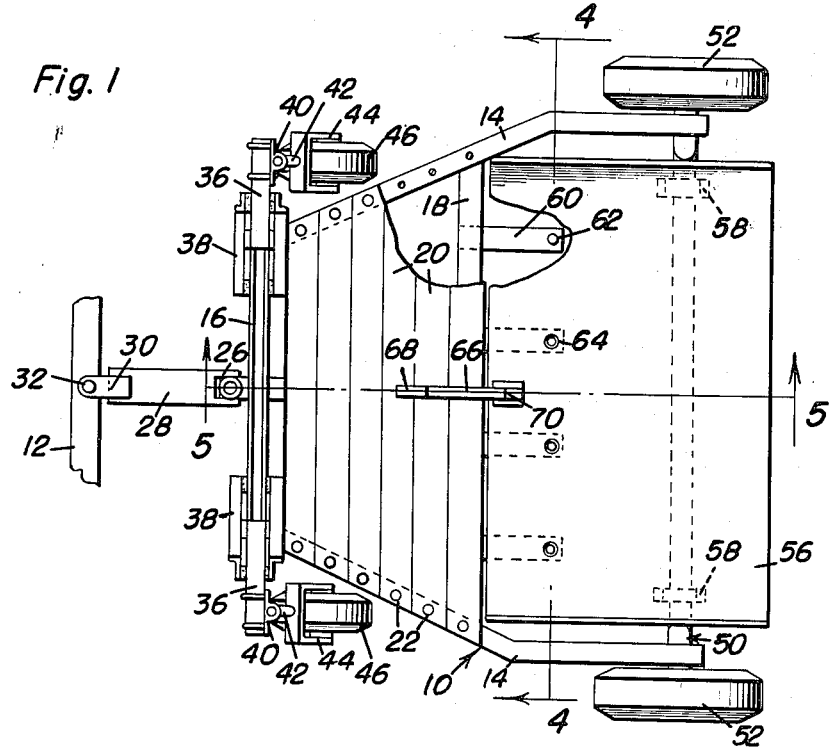
Figure 1 is a top plan view with parts broken away showing the bale stacker forming the subject of this invention.
Figure 2:
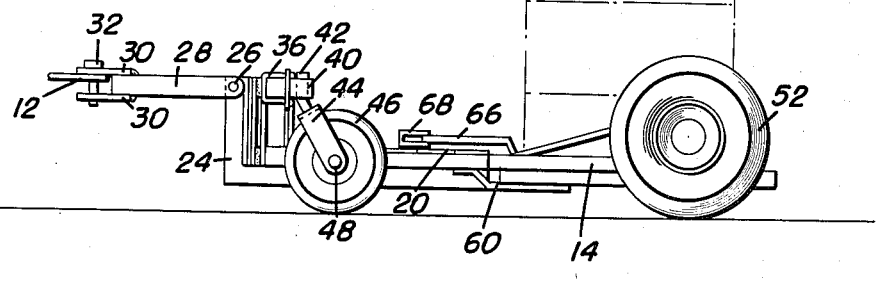
Figure 2 is a side elevational view of the bale stacker forming the subject of this invention with a plurality of bales indicated thereon in dotted lines.

Referring now more particularly to the accompanying drawings, it will be seen that the improved bale stacker forming the subject of this invention includes a horizontally disposed frame 10 adapted to be towed behind a baling machine having a rear frame member 12. The frame 10 consists of a pair of spaced side members 14 connected at their forward ends by a transverse bar 16. A transverse bar 18 connects the side members 14 intermediate the ends thereof. A plurality of planks 20 extend between the side members 14 at the forward portion of the side members 14 between the transverse bar 16 and the transverse bar 18. The planks 20 may be secured to the side members 14 by any suitable means, such as fasteners 22.

An L-shaped member 24 is mounted on the frame 10 with the longer leg thereof extending parallel to the longitudinal axis of the frame and secured to the midpoint of the transverse bars 16 and 18. The shorter leg of the L-shaped member 24 extends vertically upwardly from the frame 10 and is positioned forwardly of the transverse bar 16. A pin 26 extends through the upper end of the shorter leg of L-shaped member 24. A tow bar 28 is provided with a bifurcated end straddling the upper end of the shorter leg of the L-shaped member 24, and the bifurcated end is provided with aligned apertures for receiving the pin 26 for pivotally mounting the tow bar 28 to the L-shaped member 24. A pair of ears 30 are secured to the forward end of tow bar 28 and are disposed in substantially horizontal planes. A pin 32 extends through each of the ears 30 and is adapted to engage an aperture in the rear frame member 12 of the baling machine to connect the tow bar thereto.

Secured to each end of the transverse bar 16 and extending upwardly therefrom is a support leg 34. Rigidly secured to the upper end of each leg 34 is a horizontally disposed arm 36. Each arm 36 extends in a direction opposite to the other arm 36 and suitable brace means 38 are provided for more rigidly maintaining the legs 34 and the arms 36 in position.

Fixedly secured to the outer end of each arm 36 is a rearwardly extending bracket 40. Each of the brackets 40 is provided with a vertically disposed bore which receives the upper end of a shaft 42. The shafts 42 are mounted for pivotal movement in the brackets 40. Secured to the lower end of each of the shafts 42 is a pair of downwardly extending spaced parallel arms 44. Positioned between each of the pairs of arms 44 is a wheel 46 which is mounted for rotation on a shaft 48 which extends between the lower ends of the arms 44. The wheels 46 are thus able to rotate about a horizontally disposed axis, as well as to pivot about a vertical axis.

Fixedly secured to the rear ends of side members 14 and extending therebetween is an axle 50. A wheel 52 is rotatably mounted on each end of the axle 50 outwardly of the side members 14. The portion of axle 50 disposed between the side members 14 is provided with an offset portion 54. The portion 54 is disposed vertically downwardly with respect to the axis of rotation of the wheels 52 and is also positioned below the side frame members 14.

Disposed between the side frame members 14 and pivotally secured to the offset portion 54 of axle 50 is a rear platform 56. The rear platform 56 is provided with a plurality of ears 58 which extend downwardly therefrom and surround the offset portion 54 whereby the platform 56 may pivot about the offset portion 54 as an axis. The forward edge of rear platform 56 terminates adjacent the rear edge of the transverse bar 18.

Secured to the transverse bar 18 and extending rearwardly therefrom is a plurality of arms 60. The arms 60 are provided with a rearwardly downwardly offset portion which underlies the rear platform 56 for supporting the same in horizontal position. Secured to the rear of each of the arms 60 is a projection 62 which extends vertically upwardly therefrom. The platform 56 is provided with a plurality of apertures 64 which receive the projections 62 when the platform 56 is in horizontal position. The projections 62 will extend above the upper surface of the platform 56 when the platform 56 is in the horizontal position.

Secured to the forward end of the platform 56 is a handle member 66 which extends forwardly therefrom. The handle 66 is adapted to overlie the platform formed by planks 20 when the rear platform 56 is in horizontal position. The forward end of handle 66 is provided with a hand grip 68 whereby the handle 66 may be conveniently grasped to tilt the platform 56 about the offset portion 54. Suitable brace means 70 may be provided on the platform 56 and connected to the handle 66 for more rigidly securing the handle 66 in position.

In practical use of the device, the tow bar 28 is connected to the rear of a baling machine by means of ears 30 and pin 32. As the baling machine progresses through a field and the bales are discharged from the rear end thereof, an operator standing on the platform formed by planks 20 may take each bale and place it in position on the rear platform 56. The projections 62 extending above the upper surface of platform 56 will retain the bales in position on the platform. After a predetermined number of bales have been stacked on the platform, the operator may grasp the hand grip 68 to tilt the platform 56. As the platform 56 is raised, the projections will no longer extend above the upper surface of the platform 56, and the bales that are positioned thereon may slide from the platform to be deposited on the ground in stacked relationship. Then, at a later time, the stack of bales may be conveniently removed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A bale stacker for use with a baling machine comprising a horizontally disposed frame having a forward portion and a rear portion, a tow bar connected to said forward portion and adapted to be connected to a baler, a first platform fixedly secured to said forward portion, a second platform pivotally secured to said rear portion for vertical movement about a horizontal axis disposed transverse to the direction of movement of said stacker, means connected to said second platform for imparting vertical movement thereto, a plurality of wheels rotatably mounted on said frame for supporting the same, and means mounted on said frame and operatively associated with said second platform for retaining a plurality of bales thereon when said second platform is horizontally disposed comprising a transverse bar secured to said frame adjacent the rear edge of said first platform, a plurality of arms rigidly secured to said bar and extending rearwardly therefrom and underlying said second platform, a projection on each of said arms and extending upwardly therefrom, said second platform having a plurality of apertures therein, said projections extending through said apertures and above said second platform when said second platform is in horizontal position.

References Cited in the file of this patent
UNITED STATES PATENTS

| | | |
|---|---|---|
| 1,373,000 | Gilbert et al. | Mar. 29, 1921 |
| 1,852,618 | Le Tourneau | Apr. 5, 1932 |
| 2,327,264 | Hendrickson | Aug. 17, 1943 |
| 2,390,306 | Huziker | Dec. 4, 1945 |
| 2,452,681 | Rehberger | Nov. 2, 1948 |
| 2,552,713 | Flower | May 15, 1951 |